United States Patent
Daulasim et al.

(10) Patent No.: US 6,314,668 B1
(45) Date of Patent: Nov. 13, 2001

(54) HOUSEHOLD APPLIANCE AND CASSETTE WITH DISINCRUSTANT MEANS, AND DISINCRUSTANT METHOD IN A HOUSEHOLD APPLIANCE

(75) Inventors: Denis Daulasim, Massy; Jean-Pierre Debourg, Lyons, both of (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 09/331,109
(22) PCT Filed: Dec. 19, 1997
(86) PCT No.: PCT/FR97/02357
§ 371 Date: Mar. 27, 2000
§ 102(e) Date: Mar. 27, 2000
(87) PCT Pub. No.: WO98/28485
PCT Pub. Date: Jul. 2, 1998

(30) Foreign Application Priority Data

Dec. 20, 1996 (FR) .................................... 96 16073

(51) Int. Cl.[7] .................................................. D06F 75/18
(52) U.S. Cl. ............................................................. 38/77.8
(58) Field of Search ................................ 38/77.8, 75, 94, 38/77.82

(56) References Cited

U.S. PATENT DOCUMENTS

| 4,849,484 | | 7/1989 | Heard . | |
|---|---|---|---|---|
| 5,063,697 | * | 11/1991 | Valente et al. | 38/77.8 |
| 5,138,778 | * | 8/1992 | Brandolini | 38/77.8 |
| 5,296,583 | | 3/1994 | Levy . | |
| 5,398,434 | * | 3/1995 | Biancalani | 38/77.8 |
| 5,526,595 | * | 6/1996 | Daulasim et al. | 38/77.8 |
| 6,128,839 | * | 10/2000 | Debourg et al. | 38/77.8 |

FOREIGN PATENT DOCUMENTS

| 610 997 | 8/1994 | (EP) . |
|---|---|---|
| 723 940 | 7/1996 | (EP) . |
| 2 643 066 | 8/1990 | (FR) . |
| 1 203 497 | 8/1970 | (GB) . |

\* cited by examiner

*Primary Examiner*—Ismael Izaguirre
(74) *Attorney, Agent, or Firm*—Browdy and Neimark

(57) ABSTRACT

Household appliance, in contact with an aqueous medium, having a water circuit at least partially traversing a compartment containing a disincrustant agent. The disincrustant agent is obtained by cross-linking or hardening of an organosilicic system having a disincrustant action. The system includes: an ingredient consisting of a polyorganosiloxane composition, hardenable into a siicone elastomer at room temperature or under the effect of a temperature greater than room temperature, at least partially cross-linked or not, permeable to water vapor, and an ingredient, which is hydrophilic and osmotically active, consisting of an active disincrustant material taken alone or in association with a hydrophilic auxiliary agent, dispersed in a homogenous manner within the silicone ingredient, the active disincrustant material being liberated over time, in an aqueous medium, out of the silicone ingredient hardened into elastomer, at a substantially constant rate when the temperature in the compartment is substantially constant.

23 Claims, 7 Drawing Sheets

HOUSEHOLD APPLIANCE AND CASSETTE WITH DISINCRUSTANT MEANS, AND DISINCRUSTANT METHOD IN A HOUSEHOLD APPLIANCE

TECHNICAL FIELD

The present invention relates to the general technical field of household appliances and concerns household appliances in contact with an aqueous medium and in which use is made of a disincrustant agent to avoid the formation and the deposition of scale.

The present invention also concerns a process to combat the formation and the deposition of scale in household appliances in contact with an aqueous medium.

In the present specification, by the expression "household appliances in contact with an aqueous medium", it is intended to define appliances comprising one or several channels or reservoirs made of metal, ceramic or plastic material, in which circulates or rests a cold or hot aqueous medium. As appliances meeting this definition, one will cite for example: steam irons, steam generators, steam cleaners, steam ovens, steam cookers, sterilizers, dental sprayers, fountains dispensing hot water or cold water, coffee makers, tea makers, dishwashing machines, clothes washing machines.

In the present specification, by the expression "scale", it is intended to define deposits based essentially on calcium carbonate $CaCO_3$ which forms solid accumulations at various locations of surfaces of metal, ceramic or plastic material in contact with the water, and which are of a nature to diminish the performances of such an appliance and to lead to a premature aging of certain pieces, thus reducing the useful life of the appliance.

PRIOR ART

To suppress or at least reduce the deposition of scale in household appliances, in particular in pressing irons or coffee makers, different means have already been proposed.

There are known devices permitting the utilization of tap water in pressing irons and which limits deposit of scale in these latters. Patents FR 2648163 and FR 26630532 describe an electric steam pressing iron comprising a cassette containing a demineraliser, a cassette which must be changed periodically.

There are equally known devices treating water to precipitate the scale prior to steaming by a chemical means but necessitating the addition of an acid product which is difficult to handle. There are equally known arrangements permitting the modification of the form of the scale during its formation, in a fashion such that it can be purverulent and can be carried off by the steam. The patent application EP 0610997 describes the utilization of phosphonates disposed in the reservoir in proximity to the flow. However, although dissolution in water of these products is slow and permits the iron to retain a long useful life, the dissolution is more rapid at the start of utilization and the effect diminishes too fast for the iron to attain a normal useful life. The products provided must be pellets and this is not a form which facilitates control of the dissolution in water, requiring mixtures of various and complex salts.

It is equally known to utilize polyphosphates, placed in a cartridge in a solid or divided form, in coffee makers. It is still necessary to periodically replace the cartridge. In addition, the kinetics of dissolution of the product change with the time.

SUMMARY OF THE INVENTION

The essential purpose of the present invention is to provide, and it is here a matter of the first object of the invention, a household appliance in contact with an aqueous medium comprising a water circuit at least partially traversing a compartment containing a disincrustant agent formed by a system which has not previously been described, system in which the active disincrustant matter is dispersed within an appropriate silicone matrix, and which, when it is utilized particularly for placing in operation, and this involves the second object of the invention, a process for combating the formation and the depositing of scale in household appliances in contact with an aqueous medium, permits salting-out (liberating) a controlled and suitable quantity of active disincrustant material in order to overcome the various difficulties enumerated previously with respect to the definition of the expression "scale", without presenting the drawbacks of the prior art devices. A third object of the invention concerns a removable cassette for household appliances, containing the above-cited disincrustant agent.

Thus, the present invention, taken in its first object, concerns a household appliance in contact with an aqueous medium, notably a pressing iron, comprising a water circuit at least partially traversing a compartment containing a disincrustant agent, characterized in that the disincrustant agent is obtained by cross linking or hardening of an organosilicic system having a disincrustant action comprising:

an ingredient (A) consisting of a polyorganosiloxane composition, hardenable into a silicone elastomer at ambient temperature (23° C.) or under the effect of a temperature above the ambient temperature, at least partially cross linked or not, permeable to steam, and an ingredient (B) which is hydrophilic and osmotically active, consisting of an active disincrustant material (B1) taken alone or in association with an auxiliary hydrophilic agent (B2) dispersed in a homogenous manner within the silicone ingredient (A), with the particularly according to which the active disincrustant material is liberated over time, in an aqueous medium, out of the silicone ingredient (A) hardened into an elastomer, according to kinetics substantially of zero order.

In the present specification, by the expression "osmotically active", it is intended to define an ingredient (B) which can be the active disincrustant material (B1) itself, which is capable of creating osmotic pressure at the moment of solubilization in water of elemental particles of the hydrophilic ingredient (B), in order to induce the formation of microcracks within the silicone elastomer by which the active material can be eluted. If the hydrophilia of the active disincrustant material (B1) is not sufficient to induce the formation of microcracks, and this is the case in general when the active material is not hygroscopic under the conditions of application in the course of which it is liberated, one can add thereto an auxiliary agent (B2) providing the necessary hydrophilia which will create the osmotic pressure inducing the formation of microcracks.

BRIEF DESCRIPTION OF THE DRAWINGS

The invention will be better understood from a study of the embodiments provided as non-limiting examples and illustrated in the attached figures in which.

BEST MANNER OF CARRYING OUT THE INVENTION

Figure 1:
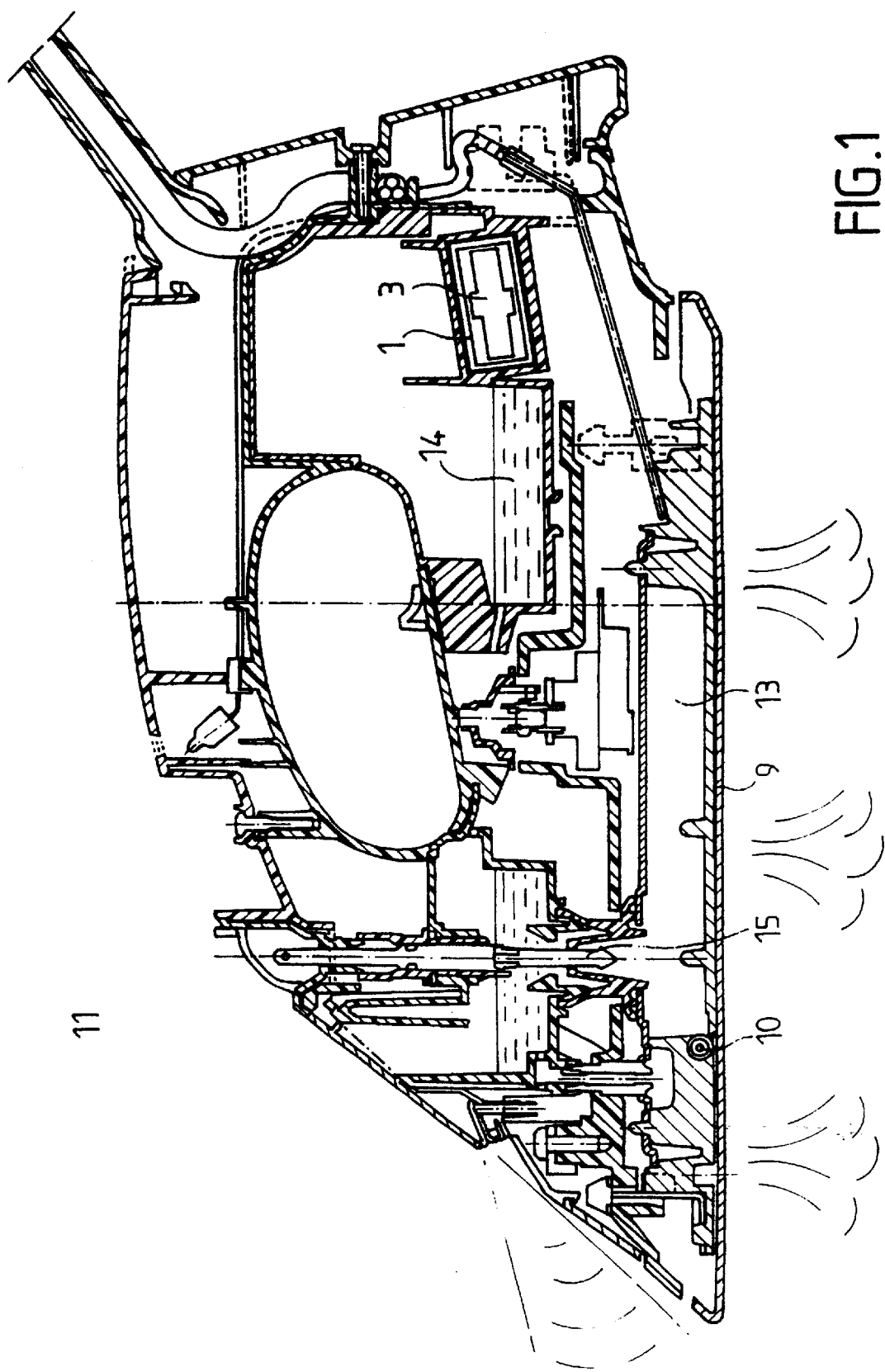
FIG. 1 is a longitudinal cross-sectional view of a pressing iron according to the invention.

The present invention, taken in its first object, concerns more particularly a household appliance 11, 12, in contact with an aqueous medium, in particular a pressing iron 11, comprising a water circuit 2 at least partially traversing a compartment 1 containing a disincrustant agent 3.

Disincrustant agent 3 is obtained by cross linking or hardening of an organosilic system constituted by a matrix (A), consisting of a polyorganosiloxane composition, hardenable into a silicone elastomer at ambient temperature (23° C.) or under the effect of a temperature higher than ambient temperature, at least partially cross linked or not, permeable to steam, said matrix (A) containing an active disincrustant material (B1) taken alone or in association with a hydrophilic auxiliary agent (B2) dispersed in a homogeneous manner within the silicone ingredient (A). With the particularity according to which the active disincrustant material is liberated over time, in an aqueous medium, out of the silicone ingredient (A) hardened into elastomer, according to kinetics substantially of 0 order. The constituents (A), (B1) and (B2) of disincrustant agent 3 will be described more precisely herebelow.

Figure 2:
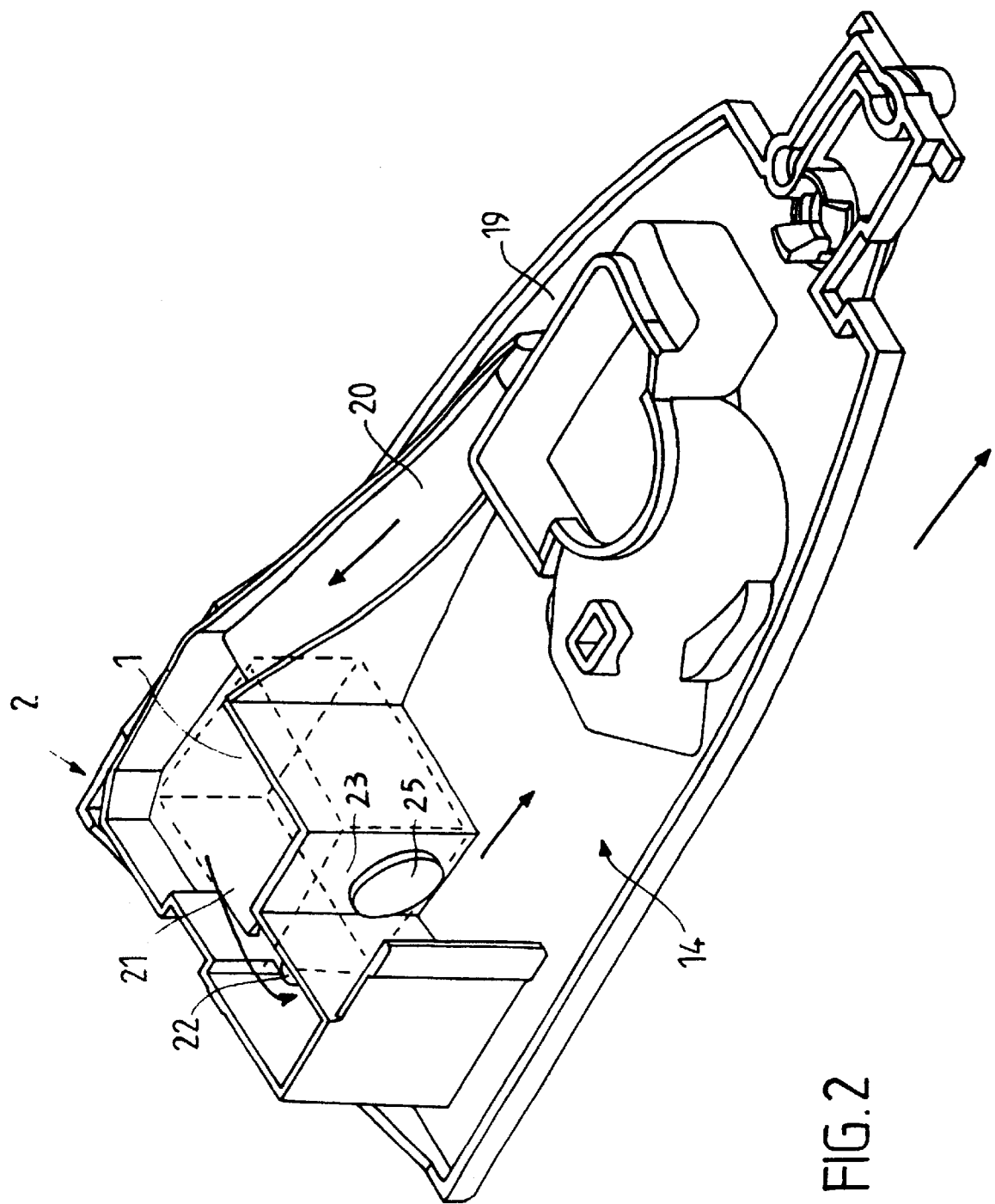
FIG. 2 is a partially exploded view of a reservoir of a pressing iron according to a preferred version of the invention.

An electric steam iron 11 according to the invention is shown in FIG. 1 and comprises in a known manner sole plate 9, heating means 10, a steam chamber 13, a water reservoir 14, a device 15 for supplying water to steam chamber 13. The iron comprises a water circuit 2 at least partially traversing a compartment 1 to receive a disincrustant agent 3, such as shown in FIG. 2.

In a preferred manner, reservoir 14 comprises a ramp 20 inclined with respect to sole plate 9 of the iron, connecting the bottom 19 of said reservoir to a chamber 21 communicating with compartment 1 by means of an inlet opening 22 disposed preferably in the lower part of said chamber, in such a manner that water elevated into chamber 21 during a displacement of iron 12 toward the front is directed into compartment 1 in order to there be treated by disincrustant agent 3. A lateral wall 23 of reservoir 14 comprises a reentry opening 25 communicating with the compartment 1, in such a manner that water which has entered compartment 1 reenters reservoir 14. The treatment of the water contained in reservoir 14 is thus achieved progressively during movements of iron 11, one part of the water contained in reservoir 14 passing into the water circuit 2 formed by ramp 20, chamber 21, compartment 1 containing disincrustant agent 3, to return into reservoir 14, such as shown in FIG. 2.

In an advantageous manner, compartment 1 is formed to be substantially parallelepipedic and presents an inlet opening 22 via which the water to be treated arrives as well as a readmission opening 25 via which the water returns into reservoir 14. In a manner still more advantageous, inlet opening 22 and readmission opening 25 are disposed on the same wall 23 at least partially forming a separation between reservoir 14 and compartment 1, such as represented in FIG. 2.

Figure 3:
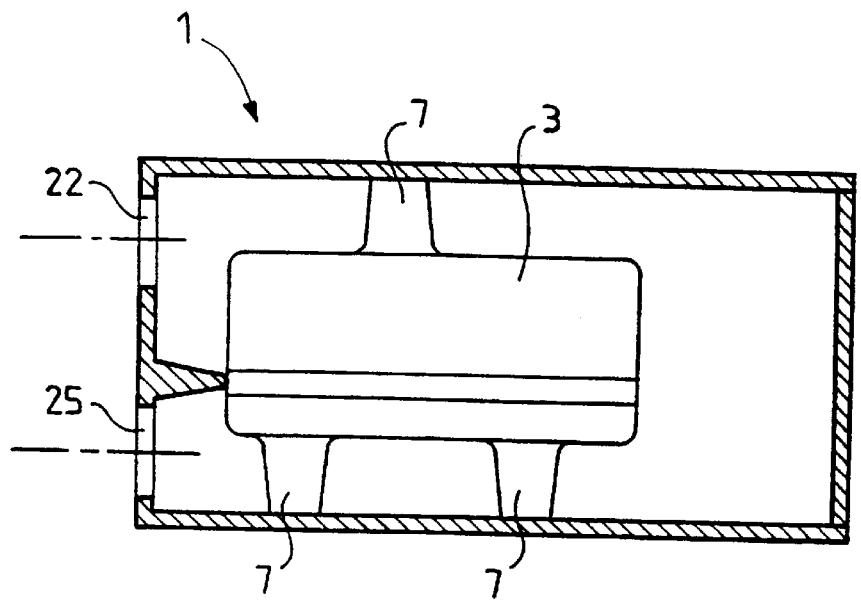
FIG. 3 is a top cross-sectional view of the compartment containing the disincrustant agent according to a preferred version of the invention.
Figure 4:
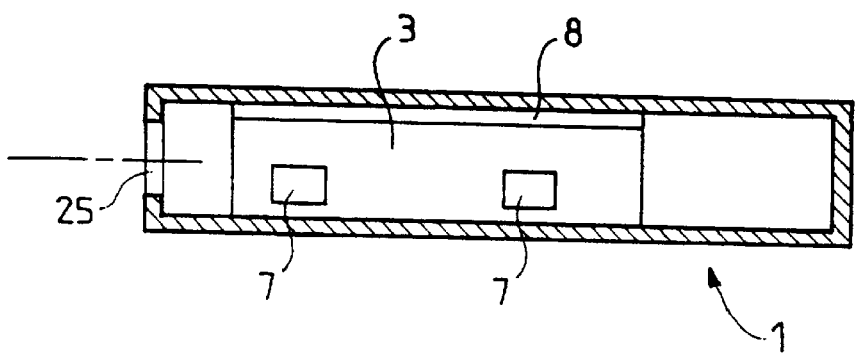
FIG. 4 is a side cross-sectional view of the compartment containing the disincrustant agent according to a preferred version of the invention.
Figure 5:
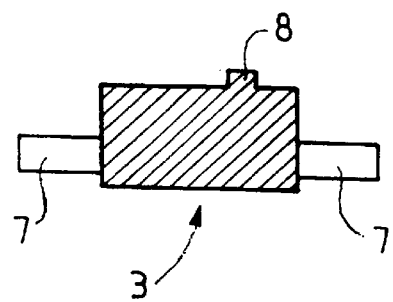
FIG. 5 is a front view of the disincrustant agent according to a preferred version of the invention.

Disincrustant agent 3 is inscribed in a preferred manner in a substantially parallelepipedic volume. Holding means, such as lugs 7 or a rib 8 are provided to center said disincrustant agent 3 in compartment 1 and to hold it in place, in a manner to arrange a water circuit around disincrustant agent 3. The holding means can be formed by the disincrustant agent itself, such as shown in FIGS. 3, 4 and 5, or be formed at least partially by means of walls, fixed or not to compartment 1 and between which disincrustant agent 3 is inserted, said walls providing the water circuit. Such an arrangement, not shown in the figures, particularly permits simplification of the geometry of the disincrustant agent. Thanks to rib 8 the water circuit at the interior of compartment 1 is predetermined. At least one part of the water circulating in the appliance enters via inlet opening 22, flows around disincrustant agent 3 and exits via the readmission opening 25 loaded with active disincrustant material (B1).

According to a variant of the invention, not shown in the figures, compartment 1 is placed in water circuit 2 between reservoir 14 and feed device 15 of steam chamber 13. All other water introduced into the reservoir thus passes through compartment 1 containing disincrustant agent 3.

Figure 9:
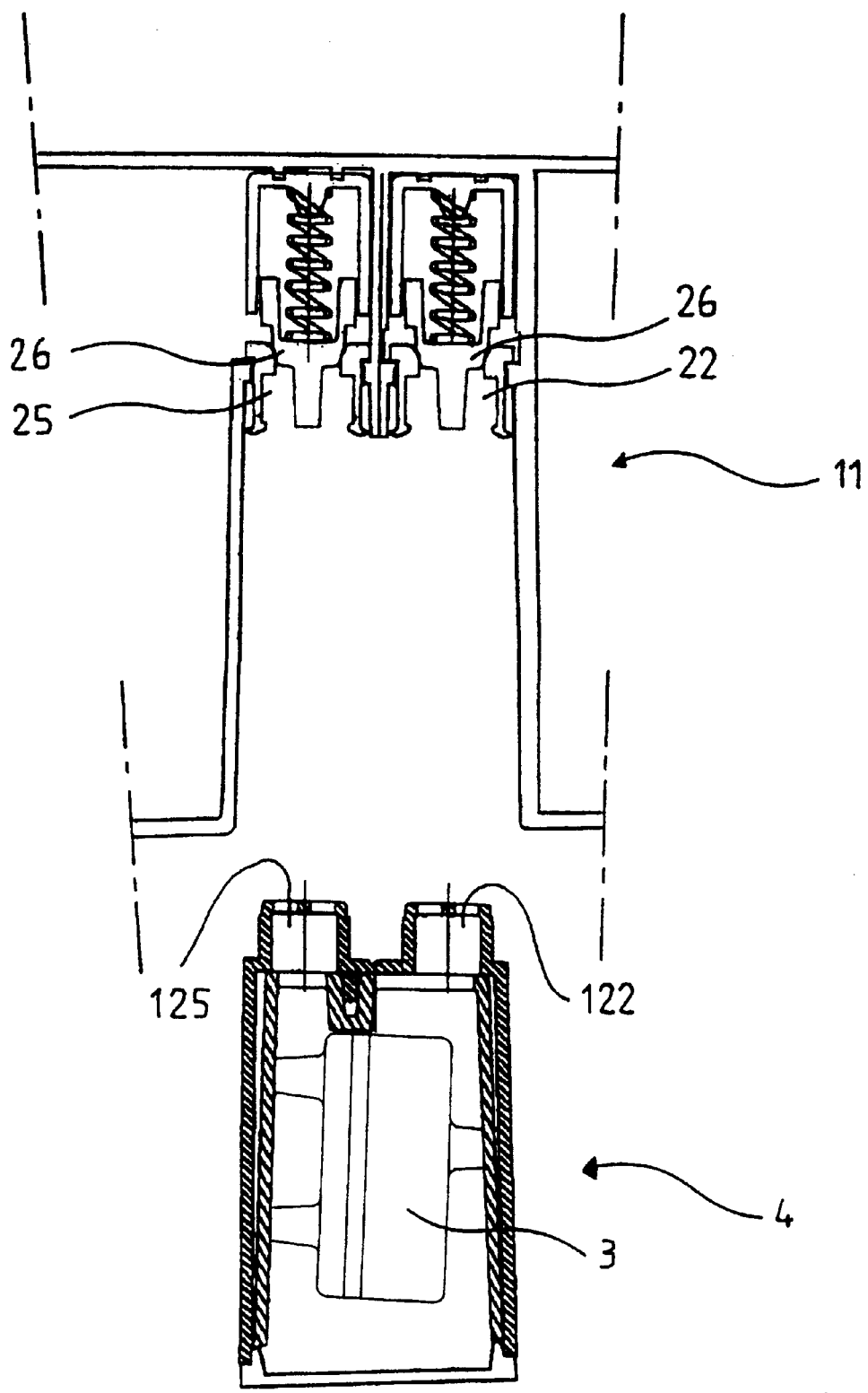
FIG. 9 is a partial cross-sectional view of an appliance and a cassette intended to contain the disincrustant agent.

According to another variant of the invention, represented in FIG. 9, compartment 1 containing disincrustant agent 3 is constituted by a cassette 4 removable from the body of appliance 11. Cassette 4 comprises a water inlet opening 122, capable of being disposed substantially opposite inlet opening 22, and a water outlet opening 125, capable of being disposed substantially opposite readmission opening 25.

According to an advantageous arrangement of the invention, inlet opening 22 and/or admission opening 25 are provided with nonreturn valves 26 preventing all outflow of water from iron 11 through said openings 22, 25 during withdrawal of cassette 4, as shown in FIG. 9, or even the entry of water present in reservoir 14 via readmission opening 25 into compartment 1 or cassette 4, or exist of water present in compartment 1 or cassette 4 via inlet opening 22 to chamber 21.

By way of example, a cassette containing a volume of 4 to 5 cm$^3$ of disincrustant agent comprising from 10 to 30% of active disincrustant material (B1) permits treatment of 100 liters of water, which is much more than known cassettes. Such a cassette can be utilized for example as a replacement for cassettes utilized in pressing irons.

The treatment proposed by the present invention leads to a deposition of pulverulent scale which can easily be entrained by the steam.

Figure 6:
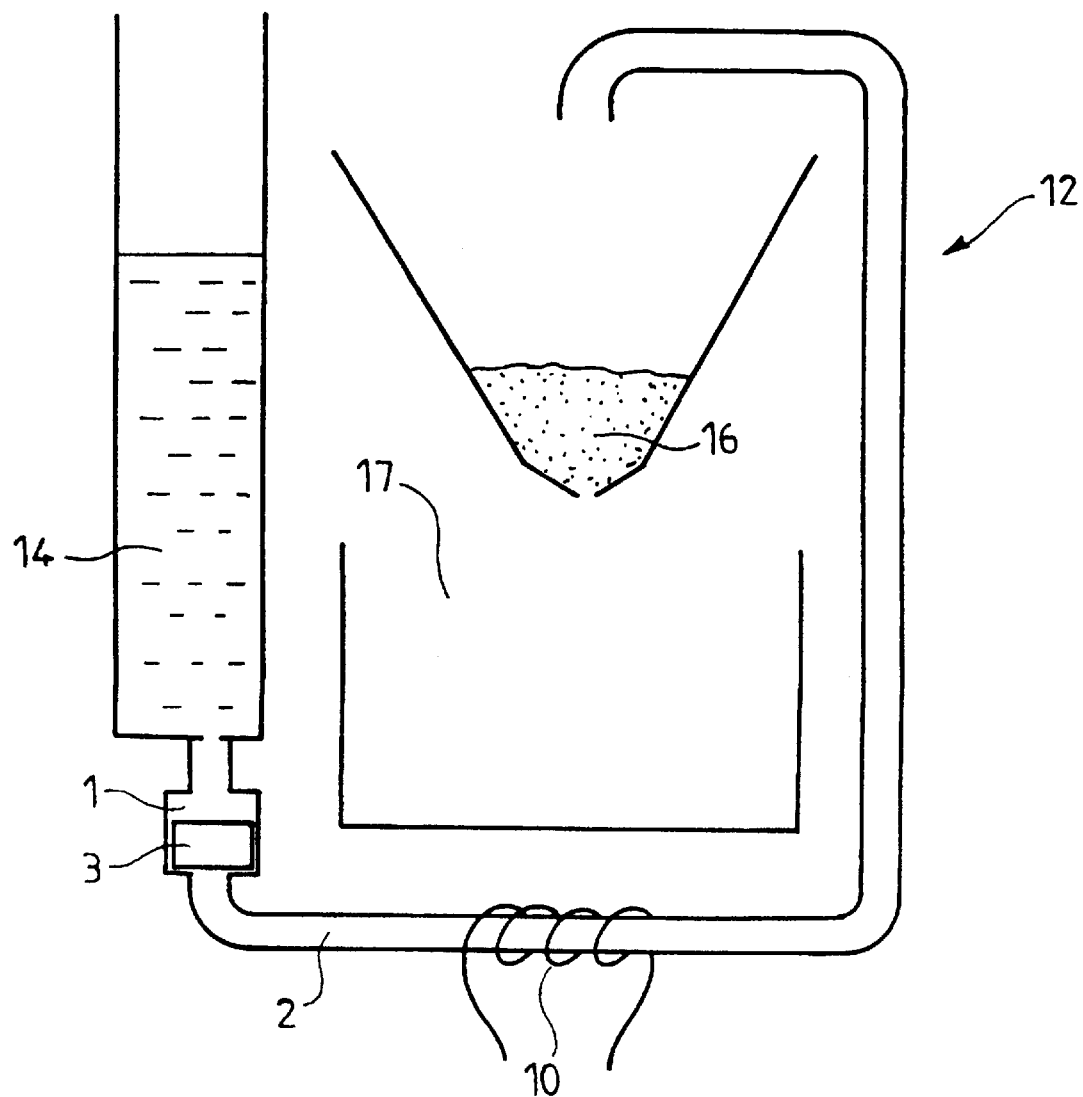
FIG. 6 is a schematic longitudinal cross-sectional view of a coffee maker according to the invention.

A coffee maker 12 according to the invention, comprising in a known manner a water reservoir 14, a water circuit 2, heating means 10, a grounds reservoir 16, a receptacle 17 provided to receive the beverage, comprises also a housing 1 containing a disincrustant agent 3, placed on the water circuit 2 preferably between water reservoir 14 and heating means 10, such as represented in a schematic manner in FIG. 6. The utilization of alimentary components (A), (B1) and (B2) permits in effect protection against scaling of household appliances having culinary uses. Disincrustant agent 3 can be advantageously disposed in a cassette 4 removable from the body of the appliance such as shown in FIG. 9.

Household appliances which are the objects of the present invention are not in any way limited to pressing irons or to coffee makers, and are household appliances in contact with aqueous media, such as for example steam generators, steam cleaners, steam ovens, steam cookers, sterilizers, dental sprayers, fountains distributing cold water and hot water, tea makers, dishwashing machines, clothes washing machines.

According to the invention, the disincrustant agent consists of an organosilicic system having a disincrustant action comprising from 5 to 50% by weight, and referably from 10 to 35% by weight of active material (B1) and possibly an auxiliary agent (B2) with respect to the weight of the whole (A)+(B1)+possibly (B2).

When one uses an auxiliary agent (B2), the weight ratio of the active material (B1) to the auxiliary agent (B2) can vary from 0.1 to 10 and, preferably, from 0.2 to 5.

The hardenable polyorganosiloxane compositions (A) utilizable in the framework of the present invention, presented in one or several packages (mono-or-multicomponent), enclosed a principle constituent formed by one or several polyorganosiloxane(s), an appropriate catalyst and possibly one or several compounds taken from the group formed by particularly: reinforcing or semi-reinforcing or packing fillers serving to adopt the rheology of the hardenable compositions, cross linking agents, adhesion agents, plastifying agents, catalyst inhibiting agents and coloring agents.

The polyorganosiloxanes, principle constituents of compositions (A) according to the invention, can be linear, branched or cross linked, can comprise hydrocarbon radicals and/or reactive groups such as for example hydroxyl groups, hydrolyzable groups, alkenyl groups and hydrogen atoms. It is to be noted that the polyorganosiloxane compounds are amply described in the literature and particularly in the work of Walter NOLL: "Chemistry and Technology of Silicones", Academic Press, 1968, $2^{nd}$ Edition, Pages 386 to 409.

More precisely, the polyorganosiloxanes, principle constituents of the compositions (A) according to the invention, are constituted by siloxyl units of the general formula:

$$R_n SiO_{\frac{4-n}{2}} \quad (I)$$

and/or siloxyl units of the formula:

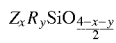

$$Z_x R_y SiO_{\frac{4-x-y}{2}} \quad (II)$$

formulas in which the various symbols have the following meaning:

the symbols R, identical or different, each represent a group of nonhydrolyzable hydrocarbonated nature, this radical being able to be:

an alkyl, radical halogenoalkyl having from 1 to 5 carbon atoms and comprising from 1 to 6 atoms of chlorine and/or fluorine, cycloalkyl and halogenocycloalkyl radicals having from 3 to 8 carbon atoms and containing from 1 to 4 atoms of chlorine and/or fluorine, aryl, alkylaryl and halogenoaryl radicals having from 6 to 8 carbon atoms and containing from 1 to 4 atoms of chlorine and/or fluorine, cyanoalkyl radicals having from 3 to 4 carbon atoms;

the symbols Z, identical or different, each represent a hydrogen atom, a $C_2$–$C_6$ alkenyl group, a hydroxyl group, a hydrolyzable atom, a hydrolyzable group;

n=a whole number equal to 0, 1, 2 or 3;

x=a whole number equal to 0, 1, 2 or 3;

y=a whole number equal to 0, 1 or 2;

the sum x+y is between 1 and 3.

By way of illustration, one can cite among the organic radicals R, directly linked to the silicon atoms: The methyl; ethyl; propyl; isopropyl; butyl; isobutyl; n-pentyl; t-butyl; chloromethyl; dichloromethyl; α-chloroethyl; α,β-dichloroethyl; fluoromethyl; difluoromethyl; α,β-difluoroethyl; 3,3,3-trifluoropropyl; trifluoro cyclopropyl; 4,4,4-trifluorobutyl; 3,3,4,4,5,5-hexafluoropentyl; β-cyanoethyl; γ-cyanopropyl; phenyl; p-chlorophenyl; m-chlorophenyl; 3,5-dichlorophenyl; trichlorophenyl; tetrachlorophenyl; o-, p- or m-tolyl; α,α,α-trifluorotoyl; xylyls such as 2,3-dimethylphenyl, 3,4-dimethylphenyl groups.

Preferably, the organic radicals R linked to the silicon atoms are methyl, phenyl radicals, these radicals possibly being halogenated or still further cyanoalkyl radicals.

The symbols Z can be hydrogen atoms, hydrolyzable atoms such as halogen atoms, in particular chlorine atoms, vinyl, hydroxyl groups or hydrolyzable groups such as for example: amino, amido, aminoxy, oxime, alkoxy, alkenyloxy, acyloxy.

The nature of the polyorganosiloxane and thus the ratios between the siloxyl units (I) and (II) and the distribution thereof is, as one says, selected as a function of the cross linking treatment that would be effectuated on the hardenable (or vulcanizable) composition in order to transform it into an elastomer.

It is possible to utilize a large variety of monocomponent or bicomponent compositions cross linking by polyaddition or polycondensation reactions in the presence of a metal catalyst and eventually of an amine or a cross linking agent.

Bicomponent or monocomponent polyorganosiloxane compositions cross linking at ambient temperature or under heat by polyaddition reactions, essentially by reactions of hydrogeno-silyl groups on alkenyl-silyl groups, generally in the presence of a metal catalyst, preferably of platinum, are described for example in U.S. Pat. Nos. 3,220,972, 3,284, 406, 3,436,366, 3,697,473 and 4,340,709. The polyorganosiloxanes entering into these compositions are in general constituted by pairs based on the one hand on a linear, branched or cross linked polysiloxane constituted by units (II) in which the remaining Z represents a $C_2$–$C_6$ alkenyl group and where x is at least equal to 1, possibly associated with units (I), and on the other hand by a linear, branched or cross linked hydrogeno-polysiloxane constituted by units (II) in which the remaining Z represents a hydrogen atom and where x is at least equal 1, possibly associated with units (I).

The bicomponent or monocomponent polyorganosiloxane compositions cross linking at ambient temperature by polycondensation reactions under the action of moisture, generally in the presence of a metal catalyst, for example a tin compound, are described, for example, for the monocomponent compositions in U.S. Pat. Nos. 3,065,194, 3,542,901, 3,779,986, 4,417,042, and in French Patent 2638752, and for the bicomponent compositions in U.S. Pat. Nos. 3,678,002, 3,888,815, 3,933,729 and 4,064,096. The polyorganosiloxanes entering into the compositions are in general linear, branched or cross linked polysiloxanes constituted by units (II) in which the remainder Z is a hydroxyl group or a hydrolyzable atom or group and where x is at least equal to 1, with the possibility of having at least a remaining Z which is equal to a hydroxyl group or to a hydrolyzable atom or group and where x is at least equal to one, with the possibility of having at least one remaining Z which is equal to a hydroxyl group or a hydrolyzable atom or group and at least one remaining Z which is equal to an alkenyl group when x is equal to 2 or 3, said units (II) possibly being associated with units (I). Similar compositions can contain in addition a cross linking agent which is particularly a silane carrying at least 3 hydrolyzable groups such as for example a silicate, an alkyltrialkoxysilane or an aminoalkyltrialkoxysilane.

The polyorganosiloxane components of these compositions cross-linking by polyaddition or polycondensation reactions advantageously present a viscosity at 25° C. at most equal to 100,000 mPa.s and, preferably, comprised between 10 and 50,000 mPa.s.

It is possible to make use, in the case of compositions cross linking at ambient temperature by polyaddition or polycondensation reactions, of polyorganosiloxane constituents having a viscosity at 25° C. greater than 100,000 mPa.s, like that situated in the interval going from a value greater than 100,000 mPa.s to 300,000 mPa.s; this modality is recommended when one wishes to prepare filled hardenable compositions in which the filler or fillers utilized have a tendency to separate by sedimentation.

It is even possible to make use, in the case of compositions cross linking at high temperature by polyaddition reactions and more precisely compositions called of the EVC type of polyaddition (EVC=heat vulcanizable elastomer), of polyorganosiloxane constituents, and in particular a polyorganosiloxane constituent or constituents carrying alkenyl-silyl groups, having a viscosity at 25° C. at least equal to 500,000 mPa.s and, preferably comprised between 1 million mPa.s and 10 million mPa.s and even higher.

It can also be a question of compositions hardenable at elevated temperature under the action of organic peroxides such as 2,4-dichlorobenzoyl peroxide, benzoyl peroxide, t-butyl perbenzoate, cumyl peroxide, di-t-butyl peroxide. The polyorganosiloxane or gum entering into such compositions (denominated simply as type EVC) is then constituted essentially by siloxyl units (I), possibly associated with units (II) in which the remaining Z represents a $C_2$–$C_6$ alkenyl group and where x is equal to 1. Such EVCs are for example described in U.S. Pat. Nos. 3,142,655, 3,821,140, 3,836,489 and 3,839,266.

The polyorganosiloxane constituent of these compositions advantageously has a viscosity at 25° C. at least equal to 1 million mPa.s and, preferably, comprises between 2 million and 10 million mPa.s and even higher.

Hardenble compositions (A) according to the invention can comprise in addition—apart from the polyorganosiloxane constituent or constituents, a catalyst and possibly a cross linking agent and/or an adhesion agent and/or a coloring agent—reinforcing, or semi-reinforcing or packing fillers, or fillers serving to adapt the rheology, which are preferably selected from among siliceous fillers.

The reinforcing fillers are selected from among combustion silicas and precipitation silicas. They have a specific surface, measured according to BET methods, of at least 50 $m^2/g$, preferably greater than 70 $m^2/g$, an average dimension of primary particles less than 0.1 micrometer ($\mu m$) and an apparent density less than 200 g/liter.

These silicas can preferably be incorporated as is or after having been treated by organosilicic compounds customarily utilized for this purpose. Among these compounds, there are methylpolysiloxanes such as hexamethyldisiloxane, octamethylcyclotetrasiloxane, methylpolysilazanes such as hexamethyldisilazane, hexamethylcyclotrisilazane, chlorosilanes such as dimethyldichlorosilane, trimethylchlorosilane, methylvinyldichlorosilane, dimethylvinylchlorosilane, alcoxysilanes such as dimethyldimethoxysilane, dimethylvinylethoxysilane, trimethylmethoxysilane. During this treatment, the silicas can increase their starting weight up to a rate of 20%, and preferably around 18%.

The semi-reinforcing or packing fillers or the fillers serving to adapt the rheology have a particle diameter greater than 0.1 $\mu m$ and are preferably selected from among ground quartz, calcined clays and diatomaceous earths.

Use can generally be made of 0.5 to 120% by weight, preferably 1 to 100% by weight of filler, with respect to the weight of the organopolysiloxane constituent or constituents of compositions (A).

The polyorganosiloxane compositions (A) preferred in the framework of the present invention are those bicomponents cross linking at ambient temperature or when heated by polyaddition reactions, which comprise:
  (a) 100 parts by weight of linear polydiorganosiloxane oil blocked at each end of the chain by a vinyldiorganosilyl unit of which the organic radicals linked to the silicon atoms are selected from among methyl, ethyl and phenyl radicals, at least 60 molar % of these radicals (and preferably the totality of these radicals) being methyl radicals and having a viscosity going from 400 to 50,000 mPa.s at 25° C.;
  (b) at least one polyorganohydrogenolsiloxane selected from among homopolymers and linear, cyclic or network copolymers having on the average per molecule at least 3 hydrogen atoms linked to different silicon atoms selected from among methyl and ethyl radicals and 60 molar % at least of these radicals (preferably the totality of these radicals) being methyl radicals, and having a viscosity going from 10 to 5,000 mPa.s at 25° C., the product (b) being utilized in a quantity such that the molar ratio of the hydride functions of (b) on the vinyl groups of (a) is comprised between 1.1 and 4;
  (c) a catalytically effective quantity of a platinum catalyst;
  (d) 0 to 120 parts by weight, preferably 0 to 100 parts by weight, of siliceous fillers per 100 parts by weight of the whole of polyorganosiloxanes (a)+(b).

In an even more preferred manner, up to 50% by weight of polymer (a) is replaced by a copolymer with a matrix comprising trimethylsiloxyl, methylvinylsiloxyl and $SiO_{4/2}$ units in which 2.5 to 10 molar % of the silicon atoms comprising a vinyl group and in which the molar ratio of the trimethylsiloxyl groups to the $SiO_{4/2}$ group is comprised between 0.5 and 1.

The weight quantity of catalyst (c), calculated by weight of platinum metal is generally comprised between 1 and 600 ppm, preferably between 2 and 200 ppm, based on the weight of the totality of the organosiloxanes (a)+(b).

If there is a need to retard the cross-linking, one can add to the polyorganosiloxane compound cross-linking by polyaddition reactions, an inhibitor of the platinum catalyst. These inhibitors are known. One can in particular utilize organic amines, silazanes, organic oximes, diesters of carboxylic diacids, acetylenic cetones and above all acetylenic alcohols which form part of the preferred inhibitors (Cf. for example FR-A-1528464, 2372874 and 2704553). The inhibitor, when one is used, is provided in an amount of 0.005 to 5 parts by weight, preferably 0.01 to 3 by weight, per 100 parts of polyorganosiloxane (a).

Other preferred polyorganosiloxane compositions (A) are those, monocomponent, cross linking under heat by polyaddition reactions (compositions called of the EVC polyaddition type), which comprise:

(a') 100 parts by weight of a polydiorganosiloxane gum, which is a homopolymer or linear copolymer presenting on the average per molecule at least 2 vinyl groups linked to different silicon atoms, situated in the chain and/or at the end of the chain, of which the other organic radicals linked to the silicon atoms are selected from among the methyl, ethyl, phenyl radicals, at least 60 molar % of these other radicals (and preferably the totality of these other radicals) being methyl radicals, and said gum having a viscosity of at least 500,000 mPa.s at 25° and preferably at least 1 million mPa.s;

(b') at least one polyorganohydrogenolsiloxane selected from a among the monopolymers and the linear, cyclic or matrix copolymers having on average per molecular at least 3 hydrogen atoms linked to different silicon atoms and of which the organic radicals linked to the silicon atoms are selected from among methyl, ethyl, phenyl radicals, and 60 molar % at least of these radicals (and preferably the totality of these radicals) being methyl radicals, and having a viscosity going from 10 to 5,000 mPa.s at 25° C., the product (b') being utilized in a quantity such that the molar ratio of the hydride functions of (b') to the vinyl groups of (a') is comprised between 0.4 and 10 and preferably between 1.1 and 4;

(c') a catalytically effective quantity of a platinum catalyst;

(d') 0.5 to 120 parts by weight, preferably 1 to 100 parts by weight, of siliceous filler(s) per 100 parts by weight of the whole of the polyorganosiloxanes (a')+(b').

The gum (a') is constituted, along its chain, of units (I) where n=2, possibly associated with units (II) where Z=vinyl and where x=y=1, and it is blocked at each extremity of the chain by a unit (II) where Z=vinyl and where x=1 and y=2 or by a unit (I) where n=3; however the presence in the mixture of corresponding units or units of different structure, for example of formula (I) with n=1 and/or $SiO_{4/2}$ and/or of formula (II) where Z=vinyl and where x=1 and y=0, is not excluded in the proportion of at most 2% with respect to the total number of corresponding units.

In a manner still more preferred, uses made as the constituent (b'), of at least one linear polyorganohydrogenosiloxane of which the chain is constituted essentially of units (II) where Z=H and where x=y=1, possibly associated with units (I) where n=2, this chain being blocked at each extremity by a unit (II) where Z=H and where x=1 and y=2 or by a unit (I) where n=3.

The weight quantity of catalyst (c'), expressed in weights of platinum metal with respect to the weight of the gum (a') and of the hydrogeno-silyl compound (b') is comprised between 0.001 and 1% and preferably between 0.05 and 0.5%.

Silicone compositions (A) can comprise in addition, besides constituents (a'), (b'), (c') and (d'), from 1 to 10 parts per weight of polydimethylsiloxane oil(s) (e') at the silanol extremities with a viscosity at 25° C. comprised between 10 and 5,000 mPa.s, per 100 parts of gum (a').

Other polyorganosiloxane compositions (A) preferred are also those, monocompounds called of the EVC type, comprising:

(a") 100 parts per weight of a polydiorganosiloxane gum which is a homopolymer or a linear copolymer having on average per molecular at least 2 vinyl groups linked to different silicon atoms, situated in the chain and/or at the ends of the chain, of which the other organic radicals linked to the silicon atoms are selected from among methyl, ethyl, phenyl radicals, at least 60 molar % of these other radicals (preferably the totality of these other radicals) being methyl radicals, and said gum has a viscosity of at least 1 million mPa.s 25° C., and preferably at least 2 million of mPa.s;

(b") 0.1 to 7 parts per weight of an organic peroxide;

(c") 0.5 to 120 parts per weight preferably 1 to 100 parts per weight, of siliceous filler(s) per 100 parts by weight of gum (a").

The gum (a") is constituted, along its chain, of units (I) where n=2 possibly associated with units (II) where Z=vinyl and where x=y=1, and it is blocked at each extremity of the chain by a unit (II) where Z=vinyl and where x=1 and y=2 or by a unit (I) where n=3; however, the presence in mixture with these similar units, of units of different structure, for example of the formula (I) with n=1 and/or $SiO_{4/2}$ and/or of formula (II) where Z=vinyl and where x=1 y=0, is not excluded in the proportion of at most 2% with respect to the total number of similar units.

Organic peroxides (b") are utilized in the amount of 0.1 to 7 parts, preferably 0.2 to 5 parts, per 100 parts of gums (a"). They are well known to technicians and comprise more especially benzoyl peroxide, 2,4-dichlorobenzoyl peroxide, dicumyl peroxide, 2,5-bis(t-butylperoxy)2, 5dimethylhexane, t-butyl perbenzoate, peroxy t-butyl and isopropyl carbonate, di-t-butyl peroxide, 1,1-bis(t-butylperoxy)3,3,5trimethylcyclohexane.

The compositions (A) according to the invention, of EVC type, can comprise in addition from 1 to 10 parts by weight of polydimethylsiloxane oil(s) (d") with silanol extremities with a viscosity at 25° C. comprised between 10 and 5,000 mPa.s per 100 parts of gum (a").

These compositions can also comprise furthermore 0.01 to 4 parts, preferably from 0.02 to 2 parts, per 100 parts of gum (a"), of methacryloxyalkltrialcoxysilanes (e") or acryloxyalkyltrialcosysilanes.

By way of concrete examples of these silanes (e") can be cited: methacryloxypropyltrimethoxysilane $CH_2=C(CH_3)COO(CH_2)_3Si(OCH_3)_3$, methacryloxypropyltriethoxysilane $CH_2=C(CH_3)COO(CH_2)_3Si(OC_2H_5)_3$, acryloxypropyltrimethoxysilane $CH_2=CH-COO(CH_2)_3Si(OCH_3)_3)_3$.

We return to now to the definition of ingredient (B).

As active disincrustant material (B1), hydrophilic or not, it is intended to define:

(B1.1) not only chemical compounds capable of complexing calcium, but also, (B1.2) compounds capable of modifying the precipitation state of the scale in such a manner that this latter remains in suspension and is not deposited on the surfaces of the appliances.

As active material of the type (B1.1), one can particularly utilize:

at least one polyphosphate, possessing chain anions, of the general formula $$M_{n+2}(P_nO_{3n+1}) \tag{III}$$

in which: M is an ammonium, sodium, potassium or aluminum cation; n is a number varying from 2 to 10, preferably from 3 to 8;

at least one metaphosphate, possessing cyclic anions, of the general formula:

$$M_m(PO_3)_m \quad (IV)$$

in which: M has the significance given in formula (III); m is a number varying from 3 to 30, preferably from 15 to 25;

at least one ultraphosphate, possessing cross-linked anions and/or cyclic anions, of the general formula:

$$(xM_2O), P_2O_5 \quad (V)$$

in which: M has the significance given in formula (III); x is a number satisfying the relation 0<x<1;

associations of at least one polyphosphate of formula (III) and/or at least one metaphosphate of formula (IV) with at least one salt of zinc or of bivalent copper derived from a mineral acid or an organic acid, as for example zinc sulfate, zinc chloride, zinc acetate, copper sulfate, copper chloride, copper acetate;

at least one salt of zinc or of copper derived from a mineral acid or from an organic acid like for example one of the salts cited in the preceding paragraph;

at least one organophosphonic compound including hydroxyphosphonoacetic acid, 1-hydroxyethylidene-1,1-diphosphonic acid and their salts of sodium, potassium, ammonium and aluminum;

at least one mono-,di- or triester of orthophophoric acid of which the ester part derives from an aliphatic, aromatic or alkylaromatic alcohol;

at least one salt of sodium or of potassium of ethylenediaminetetracetic acid (EDTA) or of nitrilotriacetic acid (NTA);

a mixture of two or of more than two of these above-cited active materials.

The above-cited active materials, when it is a question of salt, can contain water of hydration or water of constitution.

As active material of type (B1.2), one can particularly utilize:

a polymer derived from (meth)acrylate of sodium or of potassium;

a copolymer derived from a vinylic monomer, such as for example acrylonitrile, acrylamide, a $C_1$–$C_4$ alkyl (meth)acrylate, fumaric acid or maleic acid, and a vinylsulfonic monomer, such as for example vinylsulfonic acid or allylsulfonic acid.

The active disincrustant material (B1) utilized preferentially is selected from among the hydrophilic metaphosphates of the type (B1.1) of formula (IV) where M represents sodium or potassium and m varies from 6 to 22, and, among these, sodium hexametaphosphate and potassium hexametaphosphate are the most preferred.

The auxiliary agent (B2), when there is a need to utilize one, is generally selected from among the alkaline or alkaline-earth derivatives of strong acids, such as for example sulfuric acid, hydrochloric acid or nitric acid. One can cite by way of example alkaline chlorides, sulfates or nitrates, in particular of sodium, potassium or ammonium.

As stated hereabove the active ingredient (B) is dispersed in a homogeneous fashion within the hardenable organopolysiloxane composition (A). This active principal is present in the form of a powder at room temperature; it is then desirable that said powder have an average granulometry comprised between 1 and 500 $\mu$m and, preferably, between 20 and 200 $\mu$m. When one speaks of a group of particles having an average granulometry comprised in a given interval, it is necessary to understand that more than 50% by weight of these particles has a granulometry comprised within the interval (from 50 to 100% by weight of the particles).

In the preferred case of a polyorganosiloxane bicomponent polyaddition compound, generally one first disperses the active ingredient in the first part enclosing the alkenylsilyl groups and often the catalysts, then one subsequently mixes the totality (first part+active ingredient in dispersion) with the second part enclosing the hydrogeno-silyl groups. A variant of realization consists in simultaneously mixing the active ingredient (B) with the first part and the second part of the bicomponent composition.

In the other preferred cases of organopolysiloxane monocomponent compositions of the EVC polyaddition type and of the EVC type relying on the use of a gum, dispersion of the active ingredient is generally obtained by performing, at room temperature and in the absence of humidity in the air, in a conventional mixer, a preparation of a paste starting from the organopolysiloxane composition (A) in the liquid state and of the active ingredient in the solid state. By way of example of mixers one can cite paddle mixers, helix mixers, blade or anchor mixers, pug mills, mixing mills, screw mixers. The various constituents are incorporated in the mixing apparatus in any order. It is however recommended to load:

with regard to the composition of the polyaddition EVC type: the gum (a'), then in order the siliceous filler (d'), the active ingredient (B), possibly the additive (e') and lastly the components (b') and (c'); if the composition must be stored before use, it can be desirable to add an effective quantity of an inhibitor of the catalytic action of the platinum which disappears in the presence of heat during vulcanization of the composition. One can then utilize as an inhibitor the same compounds as those discussed hereabove in the present specification with respect to bicomponent polyaddition compositions; the inhibitor, when one is used, is provided in an amount of 0.005 to 5 parts by weight, preferably 0.01 to 3 parts by weight, per 100 parts of gum (a');

with regard to the EVC type composition: the gum (a"), then in order the siliceous filler (c"), possibly the additive (d") and/or the additive (e"), the active ingredient (B), and lastly the compound (b").

The present invention, taken in its second object, concerns a process for combating the formation and the depositing of scale in household appliances in contact with an aqueous medium; this process is characterized in that it consists in linking together the following steps:

1) cross-linking or hardening an elastomer of the polyorganosiloxane composition (A) within which is dispersed the active ingredient (B); then
2) immersion in the aqueous medium to be treated of a selected quantity of silicone elastomer obtained at the end of step 1;

in order to liberate in the aqueous medium a controlled quantity of active disincrustant material.

In step 1, the cross-linking or hardening into an elastomer is achieved:

either by heating of the organosilicic system (A)+(B) at a temperature going for example from 80° C. to 250° C. during a time going for example from 30 seconds to 4 hours in the case of a system based on an EVC type composition; or a temperature going for example from 65° C. to 200° C. during a time going for example from 30 minutes to 4 hours in the case of a system based on a polyaddition polyorganosiloxane composition utilizing a metal catalyst;

or by allowing the organosilicic system (A)+(B) to rest at room temperature (23° C.) and in a humid environment during a time going for example from 12 hours to 5 days or more in the case of a system based on a polycondensation polyorganosiloxane composition, a slight heating, for example to a temperature below 100° C., being able to permit acceleration of the cross-linking into elastomer.

In the framework of step 1, the organosilicic system (A)+(B) before cosslinking, can be extruded or molded in the form of unitary modules having various forms such as for example spheres, cylinders, cubes, films, ribbons, bands, said modules being able to be integrated into compartments 1 of the appliances, said compartments being able to be advantageously constituted by cassettes removable from the appliance body.

One can, in particular, mold the organosilicic system in the form of a cylinder having a diameter comprised for example between 0.1 and 5 cm, or in the form of a parallelepiped comprising lugs 7 and a rib 8, such as shown in FIGS. 3, 4 and 5.

More precisely in the framework of step 2, after cross-linking or hardening, the modules of silicone elastomer obtained can be cut, for the disincrustant treatment of the aqueous medium, to a desired length in a manner such that advantageously each unitary module forming the disincrustant agent 3 comprises a sufficient quantity of active disincrustant material for an appropriate useful life for the appliance, for example a duration equivalent to two months of continuous service. The module or modules forming the disincrustant agent 3 of the appliance, advantageously disposed in a cassette removable from the body of the appliance, can be easily replaced by the user.

In a surprising manner, it has been discovered that the organosilicic systems (A)+(B) utilized, after cross-linking or hardening into silicone elastomer, have physical characteristics sufficient for the applications envisioned in the present specification and liberate active disincrustant material in a controlled manner preferably during at least 2 months. It has been noted also that if water is not renewed around disincrustant agent 3, or there is no longer water around disincrustant agent 3, the matrix ceases to liberate the active disincrustant material (B1). At the start, after an excess effect which is very short and not troublesome, the matrix again liberates in a controlled manner the active disincrustant material.

In a surprising manner also, it has been found that the organosilicic system (A)+(B), leading after cross-linking or hardening into elastomer to the disincrustant agent utilized in the present invention, liberates the active disincrustant ingredient according to kinetics substantially of the order of zero and in a continuous manner, and this until at least 50% by weight of the ingredient is liberated. The considerable advantage provided by this organosilicic system is thus that it is very easy to extrapolate the continuous diffusion of the active ingredient after a measurement of the liberated quantity representing 10 to 15% by weight of the initial active ingredient since one knows that the kinetics of diffusion are substantially of the order of zero and that at least 50% of the active ingredient will be liberated according to these kinetics.

It is thought that, despite its weak solubility in the silicone elastomer, the active ingredient (B) is liberated in the course of time not by a diffusion mechanism within the elastomer, but according to a mechanism of microcracks which can be decomposed in the four following steps: (i) penetration of water into the silicone elastomer, (ii) hydration of the elemental particles of the ingredient (B), (iii) internal tearing of the silicone material under the action of osmotic pressure generated by the grains and (iiii) elution of the active ingredient. This system presents the advantage of permitting control of the liberation of the active ingredient by mastery of the fundamental parameters such as particularly the granulomerty (g) of the particles of the active ingredient, the proportion (t) of the active ingredient within the silicone elastomer and the quantity of elastomer immersed in the aqueous medium. The smaller is (g) and the lower the speed of liberation. The greater (t) and the greater the flow of active ingredient toward the aqueous receiving medium; it is to be noted that when the proportion is situated above 50% by volume, on the one hand the realization of forming into a paste becomes difficult and on the other hand one is situated in the zone called of percolation marked by the appearance of preferred paths during elution, because of the close proximity of the grains of the active ingredient.

The examples given hereafter illustrate the invention in a nonlimiting manner. In all that follows, the %s and parts are by weight, in the absence of indications to the contrary.

EXAMPLE 1

1. Preparation of the organosilicic system leading to the disincrustant agent utilized in the present invention by utilizing a bicomponent organopolysiloxane composition, cross-linking by polyaddition reactions:

1.1-Preparation of component no. 1: the following constituents are homogenized at ambient temperature (23° C.) in a mixer:

(a1): 25 parts of silicone resin comprising 40% molar of units $(CH_3)_3SiO_{1/2}$, 6% molar of units $(CH_3)(CH_2=CH) SiO_{2/2}$ and 53.5% molar of units $SiO_{4/2}$ and containing 0.06 vinyl function for 100 g of resin;

(a2): 75 parts of a polydimethylsiloxane oil blocked at each of the extremities of its chain by a unit $(CH_3)_2(CH_2=CH) SiO_{1/2}$: the viscosity of this oil is 3500 mPa.s at 25° C., and it contains 0.0073 vinyl function per 100 g;

(c): 40 ppm calculated by weight, with respect to the totality (a1)+(a2)+(b) (Cf. herebelow), of platinum metal carried by a solution of 0.25% chloroplatinic acid prepared by agitation at ambient temperature of 0.6 part of hexachloroplatinic acid, 10 parts of isopropanol, 55 parts of zylene and 6 parts of 1,1,3,3-tetramethyl 1,3 divinyldisiloxane.

1.2-Preparation of component no. 2: The following constituents are homogenized at room temperature (23° C.) in a mixer:

(b): 41 parts of hydrogenated liquid silicone resin, with a viscosity of 500 mPa.s at 25° C., prepared by hydrolysis of ethyl silicate and of $(CH_3)_2$ HSiCl in quantities corresponding to one mole of silicate per two moles of $(CH_3)_2$ HSiCl in solution in toluene; this resin thus presents a theoretical molar ratio of units $(CH_3)_2HSiO_{1/2}/SiO_{4/2}$ of 2 and a real molar ratio of 2.23, and it contains 0.93 SiH function per 100 g of resin;

14.75 parts of the resin (a1) of composition no. 1; and 44.25 parts of vinylized oil (a2) of composition no. 1.

1.3- Preparation of the organosilicic system leading to the disincrustant agent utilized in the present invention:

the organosilicic system leading to the disincrustant agent utilized in the present invention is obtained by mixing, at room temperature, of 65.4 parts of composition no. 1 with 6.6 parts of composition no. 2 and with 18 parts of sodium hexametaphosphate. This mixture is effected with the aid of a mixer by operating under a reduced pressure of 100.10² Pa and agitation is maintained during 30 minutes in a manner to effectively disperse the sodium hexametaphosphate.

The sodium hexametaphosphate utilized presents the following granulometric characteristics

| Mesh ($\mu$m) | Accumulated Screenings (% by Weight) |
|---|---|
| 800 | 0.02 |
| 315 | 15.4 |
| 150 | 54.1 |
| 80 | 75.4 |

The mixture obtained is then poured into a metal mold preheated to 150° C. The mold is of cylindrical form with an interior diameter of 1.7 cm and a height of 7 cm. After filling, the mold is immediately placed in a study [sic: oven] at 150° C., for 1 hour. After cooling and unmolding, the organosilicic system cross-linked into an elastomer, containing sodium hexametaphosphate is cut into individual cylinders of 1 cm height, denominated hereinafter: cylindrical matrices.

2. Experimental protocol for measurement of the kinetics of elution and water:

Each cylindrical matrix, containing 20% by weight of sodium hexametaphosphate, is immersed in a closed receptacle containing 400 ml of distilled water; the receptacle is equipped with a magnetic agitation and it is itself immersed in a temperature controlled water bath at 35° C.

The characteristics of the immersed cylindrical matrix are:
diameter: 1.7 cm,
height: 1 cm,
total mass: 2.64 g,
initial quantity (Q0) of sodium hexametaphosphate: 0.528 g.

The quantity of sodium hexametaphosphate liberated is followed by conductimetric quantitative analysis according to the method described herebelow. The measurement is performed with a TACUSSEL® conductance meter/resistance meter of the CDRV 62 type equipped with a RADIOMETER COPENHAGEN TE 100 cell. At the moment of measurement, the cell is immersed in the liberation medium at 35° C. and under moderate agitation (magnetic agitator). The conductivity is read in milli Siemens (m S) which is converted into mg of sodium hexametaphosphate per ml of solution with the aid of a calibration curve preliminarily established with aqueous solutions of hexametaphosphate at 5 mg/l and 2500 mg/l. The values obtained are corrected to take into account the evolution of the conductivity of sodium hexametaphosphate solutions at 35° C. as a function of time. This permits to determine at a given instant the concentration in the liberation medium of disincrustant material and to calculate the quantity of disincrustant material liberated.

Figure 7:
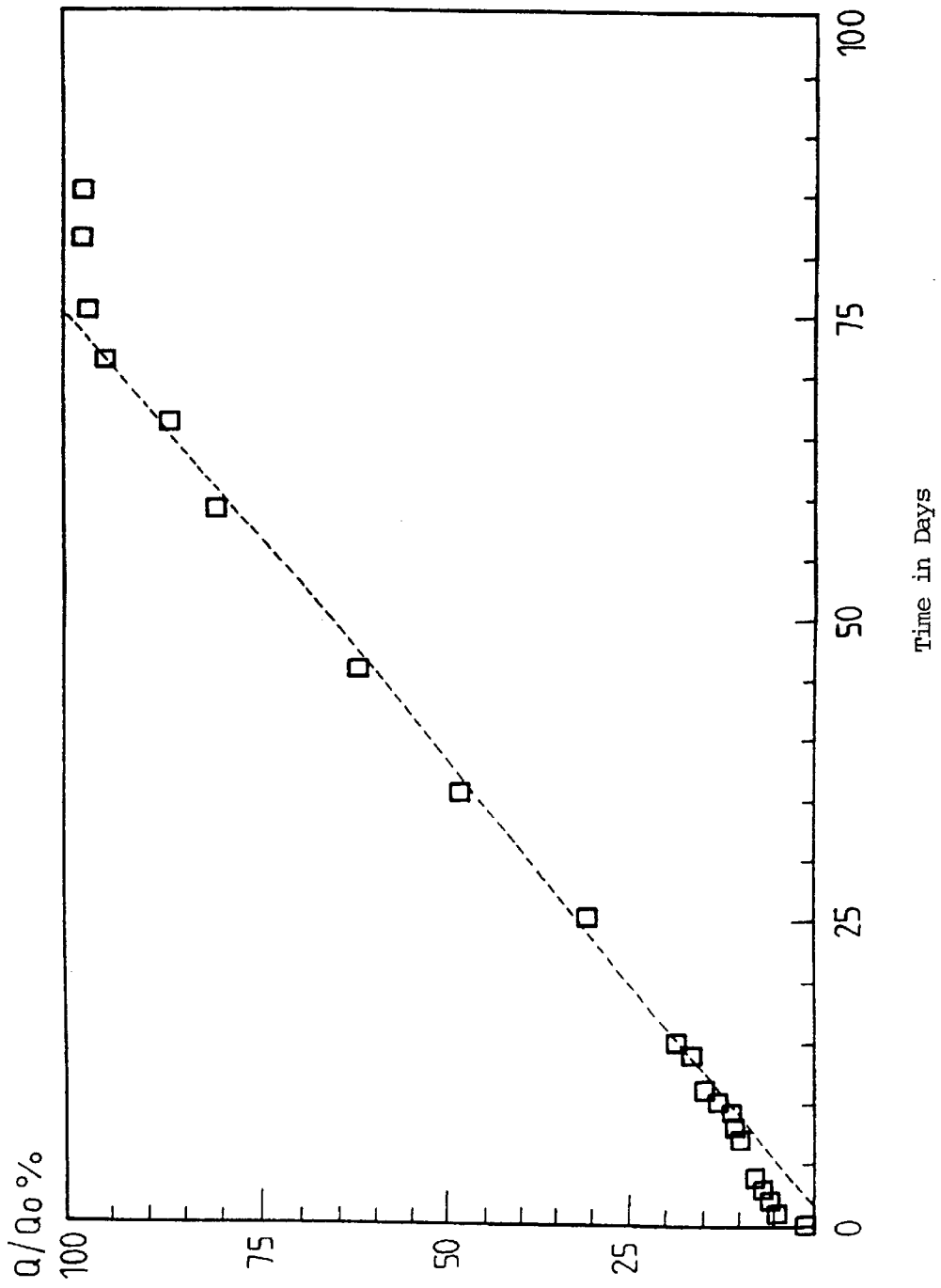
FIG. 7 presents a first example of the elution curve $Q/Q0=f(t)$ in a temperature controlled aqueous medium at 35° C., where Q0 represents the initial quantity of sodium hexametaphosphate and Q the cumulative quantity of sodium hexametaphosphate liberated at the time t.

The quantitative analysis performed permits tracing the curve Q/Q0=f(t), where Q0 represents the initial quantity of sodium hexametaphosphate and Q the cumulative quantity of sodium hexametaphosphate liberated at the instant t. The curve Q/Q0=f(t) is presented on attached FIG. 7.

EXAMPLE 2

1. The preparation of the organosilicic system leading to the disincrustant agent utilized in the present invention by use of a monocomponent organopolysiloxane composition of EVC type There is intimately mixed with the aid of a blade mixer the following constituents:
(a"): 100 parts of a (dimethyl) (methylvinyl) polysiloxane gum blocked at each of its extremities by a trimethylsiloxy unit, comprising in its chain 720 ppm vinyl groups of viscosity 10 million m.Pa.s at 25° C.;
(c"): 40 parts of treated combustion silica D4 (octamethylcyclotetrasiloxane) with a BET specific surface of 300 m²/g;
(d"): 3 parts of a linear dimethylpolysiloxane blocked at each of its two extremities by dimethylhydroxysiloxy groups with a viscosity of 50 m.Pa.s at 25° C.; and
(e"): 0.6 part of methacyloxypropyltrimethoxysilane gum.

The mixing is halted 30 minutes after the end of introduction of the filler (c"). The homogenous composition which has just been prepared is removed from mixer and is termed master-mix (MM).

The MM is transferred to a mixer with two rolls 1 mm apart, in order to incorporate:
100 parts of MM,
54 parts of sodium hexametaphosphate having the granular matrix characteristics indicated hereabove in example 1: this introduction is performed, progressively, over a period of 20 minutes; and then:
1.93 parts of 2,4-dichlorobenzoyl peroxide (catalyst (b")): this incorporation is performed during 2 minutes.

The datalyzed composition detaches easily from the rolls of the mixer. In regulating the separation of the rolls to 10 mm and their width to 200 mm, there are produced performs of dimensions 200 mm×200 mm×10 mm which are then introduced into a mold having the same dimensions, then subjected to a temperature of 115° C. and to the action of a flat press developing a pressure of 10 MPa. The molded plates thus obtained are then post-cured during 4 hours at 200° C. After cooling and unmolding, the organosilicic system cross-linked into elastomer, containing sodium hexmetaphosphate and presenting in the form of plates, is cut into parallelepipeds of dimensions 35 mm.×10 mm×10 mm, denominated hereinafter: parallelepiped matrix.

2. Experimental protocol for measurement of the kinetics of elution in water

Figure 8:
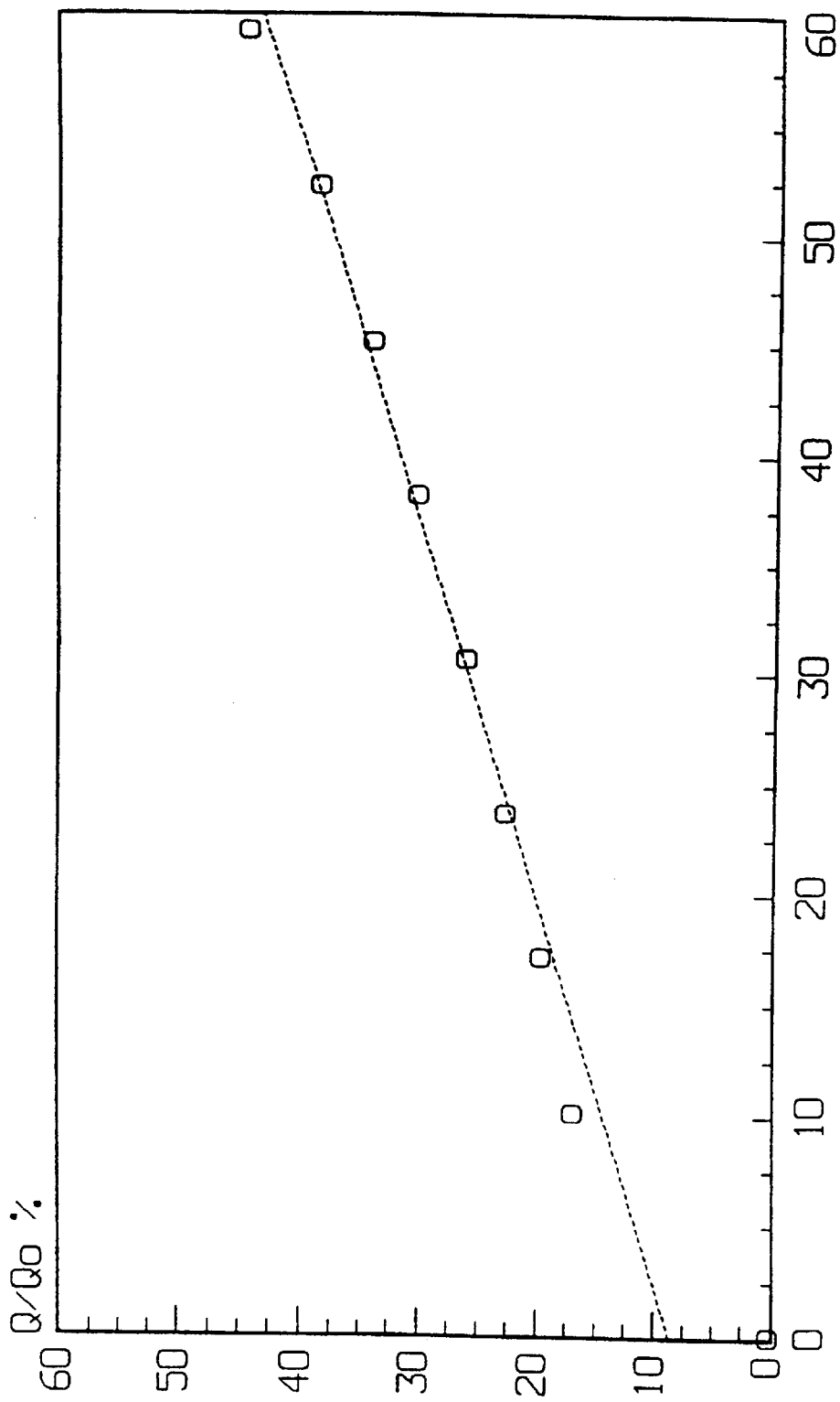
FIG. 8 presents a second example of the elution curve $Q/Q0=f(t)$ in a temperature control aqueous medium at 35° C., where Q0 represents the initial quantity of sodium hexametaphosphate and Q the cumulative quantity of sodium hexametaphosphate liberated at the time t.

The parallelepiped matrix tested, containing 34.6% by weight of sodium hexametaphosphate, is immersed in a closed receptacle containing 100 ml of distilled water; the receptacle is equipped with a magnetic agitation and it is itself plunged into a bath of water temperature controlled to 35° C. The quantity of sodium hexametaphosphate liberated is followed by conductimetric quantitative analysis according to the method described in example 1. This quantitative analysis permits tracing the curve Q/Q0=f(t), for which the initial quantity Q0 of sodium hexametaphosphate is equal to 1.88 g in the case of the matrix tested here (having a total mass of 5.43 g) and Q the cumulative quantity of sodium hexametaphosphate liberated at the moment t. The curve obtained is shown in attached FIG. 8.

Possibilities of Industrial Application

The invention finds its application in the field of household appliances.

What is claimed is:

1. Household appliance, in contact with an aqueous medium, comprising water circuit (2) at least partially traversing a compartment (1) containing a disincrustant agent, characterized in that the disincrustant agent is obtained by cross-linking or hardening of an organosilicic system having a disincrustant action comprising:
an ingredient (A) consisting of a polyorganosiloxane composition, hardenable into a silicone elastomer at room temperature (23° C.) or under the effect of a temperature greater than room temperature, at least partially cross-linked or not, permeable to water vapor, and an ingredient (B), which is hydrophilic and osmotically active, consisting of an active disincrustant material (B1) taken alone or in association with a hydrophilic auxiliary agent (B2), dispersed in a homogenous manner within the silicone ingredient (A), with the particularly according to which the active disincrustant material is liberated over time, in an aqueous medium, out of the silicone ingredient (A) hardened into elastomer, at a substantially constant rate when the temperature in the compartment is substantially constant.

2. Household appliance according to claim 1, wherein the organosilicic system with disincrustant action comprises from 5 to 50% by weight of ingredient (B) with respect to the weight of the totality (A)+(B).

3. Household appliance according to one of claim 1 wherein the active disincrustant material (B1) is selected from among the hydrophilic metaphosphates of the type (B1.1) of formula Mm (PO$_3$)$_m$ where M represents sodium or potassium and m varies from 6 to 22.

4. Household appliance according to one of claim 1 wherein the compartment (1) is constituted by a removable cassette (4).

5. Household appliance according to claim 1 wherein said household appliance is a steam iron, steam generator, steam cleaner, steam oven, steam cooker, sterilizer, dental sprayer, fountain dispensing hot water or cold water, coffee maker, tea maker, dishwashing machine, or clothes washing machine.

6. Household appliance according to claim 1, wherein the polyorganosiloxane composition hardenable into silicone elastomer encloses a main constituent formed of one or several polyorganosiloxanes, an appropriate catalyst and optionally one or several compounds taken from the groups formed by: reinforcing or semi-reinforcing or packing fillers or fillers serving to adapt the rheology of the polyorganosiloxane composition, cross-linking agents, adhesion agents, classifying agents, catalyst inhibiting agents, and coloring agents.

7. Household appliance according to claim 6, wherein the polyorganosiloxanes that are the main constituent of the composition (A) are constituted by siloxyl units of the general formula:

$$R_nSiO_{4-n/2} \quad (I)$$

and/or siloxyl units of the formula:

$$Z_xR_ySiO_{4-x-y/2} \quad (II)$$

formulas in which the various symbols have the following significance:

symbols R, identical or different, each represent a group of nonhydrolyzable hydrocarbonated nature, this radical possibly being:

an alkyl radical, halogenoalkyl having from 1 to 5 carbon atoms and comprising from 1 to 6 atoms of chlorine and/or of fluorine, cycloalkyl and halogenocycloalkyl radicals having from 3 to 8 carbon atoms and containing from 1 to 4 chlorine and/or fluorine atoms, aryl, alkylaryl and halogenoaryl radicals having from 6 to 8 carbon atoms and containing from 1 to 4 atoms of chlorine and/or fluorine, cyanoalkyl radicals having from 3 to 4 carbon atoms;

the symbols Z, identical or different, each represent a hydrogen atom, a $C_2$–$C_6$ alkenyl group, a hydroxyl group, a hydrolyzable atom, a hydrolyzable group;

n=a whole number equal to 0, 1, 2 or 3;
x=a whole number equal to 0, 1, 2 or 3;
y=a whole number equal to 0,1 or 2;
the sum x+y is comprised between 1 and 3.

8. Household appliance according to claim 6, wherein the polyorganosiloxane composition is a bicomponent composition cross-linking at room temperature or under heat by polyaddition reactions, which comprises:

(a) 100 parts by weight of linear polydiorganosiloxane blocked at each chain extremity by a vinyldiorganosilyl unit of which the organic radicals linked to silicon atoms are selected from among methyl, ethyl and phenyl radicals, at least 60 molar % of these radicals being methyl radicals, and presenting a viscosity going from 400 to 50,000 mPa.s at 25° C.;

(b) at least one polyorganohydrogenosiloxane selected from among the homopolymers and the linear, cyclic or matrix copolymers presenting on average per molecule at least 3 hydrogen atoms linked to different silicone atoms and of which the organic radicals linked to the silicone atoms are selected from among methyl, ethyl radicals and at least 60 molar % of these radicals being methyl radicals, and having a viscosity going from 10 to 5,000 mPa.s at 25° C., the product (b) being utilized in a quantity such that the molar ratio of the hydride functions of (b) on the vinyl groups of (a) is comprised between 1.1 and 4;

(c) a catalytically effective quantity of a platinum catalyst;

(d) 0 to 120 parts by weight, of siliceous fillers per 100 parts by weight of the totality of the polyorganosiloxanes (a)+(b).

9. Household appliance according to claim 6, wherein the polyorganosiloxane composition is a monocomponent composition cross-linking under heat by polyaddition reactions (compositions called of the EVC polyaddition type), which comprises:

(a') 100 parts by weight of a polydiorganosiloxane gum, which is a homopolymer or linear copolymer presenting on the average per molecule at least 2 vinyl groups linked to different silicon atoms, situated in the chain and/or at the end of the chain, of which the other organic radicals linked to the silicon atoms are selected from among the methyl, ethyl, phenyl radicals, at least 60 molar % of these other radicals (and optionally the totality of these other radicals) being methyl radicals, and said gum having a viscosity of at least 500,000 mPa.s at 25°;

(b') at least one polyorganohydrogenolsiloxane selected from among the monopolymers and the linear, cyclic or matrix copolymers having on average per molecule at least 3 hydrogen atoms linked to different silicon atoms and of which the organic radicals linked to the silicon atoms are selected from among methyl, ethyl, phenyl radicals, and 60 molar % at least of these radicals being methyl radicals, and having a viscosity going from 10 to 5,000 mPa.s at 25° C., the product (b') being utilized in a quantity such that the molar ratio of the hydride functions of (b') to the vinyl groups of (a') is comprised between 0.4;

(c') a catalytically effective quantity of a platinum catalyst; and (d') 0.5 to 120 parts by weight of siliceous filter(s) per 100 parts by weight of the whole of the polyorganosiloxanes (a')+(b').

10. Household appliance according to claim 6, wherein the polyorganosiloxane composition (A) is a monocomponent composition of the EVC type, comprising:

(a") 100 parts per weight of a polydiorganosiloxane gum which is a homopolymer or a linear copolymer having on average per molecular at least 2 vinyl groups linked to different silicon atoms, situated in the chain and/or at the ends of the chain, of which the other organic radicals linked to the silicon atoms are selected from among methyl, ethyl, phenyl radicals, at least 60 molar % of these other radicals being methyl radicals, and said gum has a viscosity of at least 1 million mPa.s 25° C.;

(b") 0.1 to 7 parts per weight of an organic peroxide; and (c") 0.5 to 120 parts per weight of siliceous filler(s) per 100 parts by weight of gum (a").

11. Household appliance according to claim 6, wherein the polyorganosiloxane compositions are bicomponent compositions cross-linking at room temperature or under heat by polyaddition reactions, which comprise:

(a) up to 50 parts by weight of a matrix copolymer comprising trimethylsiloxyl, methylvinylsiloxyl and $SiO_{4/2}$ units in which 2.5 to 10 molar percent of the silicon atoms comprising a vinyl group and in which the molar ratio of the trimethylsiloxyl groups to the $SiO_{4/2}$ group is comprised between 0.5 and 1.

(b) at least 50 parts by weight of linear polydiorganosiloxane blocked at each chain extremity by a vinyldiorganosilyl unit of which the organic radicals linked to silicon atoms are selected from among methyl, ethyl and phenyl radicals, at least 60 molar % of these radicals being methyl radicals, and presenting a viscosity going from 400 to 50,000 mPa.s at 25° C., wherein products (a) and (b) total 100 parts by weight;

(c) at least one polyorganohydrogenosiloxane selected from among the homopolymers and the linear, cyclic or matrix copolymers presenting on average per molecule at least 3 hydrogen atoms linked to different silicone atoms and of which the organic radicals linked to the silicone atoms are selected from among methyl, ethyl radicals and at least 60 molar % of these radicals being methyl radicals, and having a viscosity going from 10 to 5,000 mPa.s at 25° C., the product (c) being utilized in a quantity such that the molar ratio of the hydride functions of (c) on the vinyl groups of (b) is comprised between 1.1 and 4;

(d) a catalytically effective quantity of a platinum catalyst; and (e) 0 to 120 parts by weight, of siliceous fillers per 100 parts by weight of the totality of the polymers (a)+(b)+(c).

12. Process for combating the formation and the deposition of scale in household appliances in contact with an aqueous medium characterized in that it consists in linking together the following steps:

1) cross-linking or hardening an elastomer of the polyorganosiloxane composition (A) within which is dispersed the active ingredient (B), (A) and (B) being as defined in claim 1 then 2) immersion in the aqueous medium to be treated of a selected quantity of silicone elastomer obtained at the end of step 1;

in order to liberate in the aqueous medium a controlled quantity of active disincrustant material.

13. Process according to claim 12, wherein the household appliances in contact with an aqueous medium are steam irons, steam generators, steam cleaners, steam ovens, steam cookers, sterilizers, dental sprayers, fountains dispensing hot water or cold water, coffee makers, tea makers, dishwashing machines, or clothes washing machines.

14. Removable cassette for a household appliance comprising a water circuit, said cassette forming a compartment in which is disposed a disincrustant agent (3), said cassette comprising a water inlet opening (122) and a water outlet opening (125), said cassette being characterized in that the disincrustant agent (3) is obtained by cross-linking or hardening of an organosilicic system having a disincrustant action comprising:

an ingredient (A) consisting of a polyorganosiloxane composition, hardenable into a silicone elastomer at room temperature (23° C.) or under the effect of a temperature greater than room temperature, at least partially cross-linked or not, permeable to water vapor, and an ingredient (B), which is hydrophilic and osmotically active, consisting of an active disincrustant material (B1) taken alone or in association with a hydrophilic auxiliary agent (B2), dispersed in a homogenous manner within the silicone ingredient (A), with the particularly according to which the active disincrustant material is liberated over time, in an aqueous medium, out of the silicone ingredient (A) hardened into elastomer, at a substantially constant rate when the temperature in the compartment is substantially constant, system with disincrustant action comprises from 5 to 50% by weight of active ingredient (B) with respect to the weight of the totality (A)+(B).

15. Cassette according to claim 14, wherein the organosilicic system with disincrustant action comprises from 5 to 50% by weight of active material (B1) and possibly of auxiliary agent (B2) with respect to the weight of the totality (A)+(B1)+possibly (B2).

16. Cassette according to one of claim 14 wherein the active disincrustant material (B1) is selected from among the hydrophilic metaphosphates of the type (B1.1) of formula $M_m(PO_3)_m$ where M represents sodium or potassium and m varies from 6 to 22.

17. Cassette according to claim 14, wherein said cassette is used in a steam iron, steam generator, steam cleaner, steam oven, steam cooker, sterilizer, dental sprayer, fountain dispensing hot water or cold water, coffee maker, tea maker, dishwashing machine, or clothes washing machine.

18. Cassette according to claim 14, wherein the polyorganosiloxane composition (A) hardenable into silicone elastomer encloses a main constituent formed of one or several polyorganosiloxanes, an appropriate catalyst and optionally one or several compounds taken from the groups formed by: reinforcing or semi-reinforcing or packing fillers or fillers serving to adapt the rheology of the hardenable compositions, cross-linking agents, adhesion agents, classifying agents, catalyst inhibiting agents, and coloring agents.

19. Cassette according to claim 18, wherein the polyorganosiloxanes that are the main constituent of the composition (A) are constituted by siloxyl units of the general formula:

$$R_n SiO_{\frac{4-n}{2}} \qquad (I)$$

and/or siloxyl units of the formula:

$$Z_x R_y SiO_{\frac{4-x-y}{2}} \qquad (II)$$

formulas in which the various symbols have the following significance:

symbols R, identical or different, each represent a group of nonhydrolyzable hydrocarbonated nature, this radical possibly being:

an alkyl radical, halogenoalkyl having from 1 to 5 carbon atoms and comprising from 1 to 6 atoms of chlorine and/or of fluorine, cycloalkyl and halogenocycloalkyl radicals having from 3 to 8 carbon atoms and containing from 1 to 4 chlorine and/or fluorine atoms, aryl, alkylaryl and halogenoaryl radicals having from 6 to 8 carbon atoms and containing from 1 to 4 atoms of chlorine and/or fluorine, cyanoalkyl radicals having from 3 to 4 carbon atoms;

the symbols Z, identical or different, each represent a hydrogen atom, a $C_2$–$C_6$ alkenyl group, a hydroxyl group, a hydrolyzable atom, a hydrolyzable group;

n=a whole number equal to 0, 1, 2 or 3;

x=a whole number equal to 0, 1, 2 or 3;

y=a whole number equal to 0,1 or 2;

the sum x+y is comprised between 1 and 3.

20. Cassette according to claim 18, wherein the polyorganosiloxane composition is a bicomponent composition cross-linking at room temperature or under heat by polyaddition reactions, which comprises:
   (a) 100 parts by weight of linear polydiorganosiloxane blocked at each chain extremity by a vinyldiorganosilyl unit of which the organic radicals linked to silicon atoms are selected from among methyl, ethyl and phenyl radicals, at least 60 molar percent of these radicals being methyl radicals, and presenting a viscosity going from 400 to 50,000 mPa.s at 25° C.;
   (b) at least one polyorganohydrogenosiloxane selected from among the homopolymers and the linear, cyclic or matrix copolymers presenting on average per molecule at least 3 hydrogen atoms linked to different silicone atoms and of which the organic radicals linked to the silicone atoms are selected from among methyl, ethyl radicals and at least 60 molar percent of these radicals being methyl radicals, and having a viscosity going from 10 to 5,000 mPa.s at 25° C., the product (b) being utilized in a quantity such that the molar ratio of the hydride functions of (b) on the vinyl groups of (a) is comprised between 1.1 and 4;
   (c) a catalytically effective quantity of a platinum catalyst; and
   (d) 0 to 120 parts by weight, of siliceous fillers per 100 parts by weight of the totality of the polyorganosiloxanes (a)+(b).

21. Cassette according to claim 18, wherein the polyorganosiloxane composition is a monocomponent composition cross-linking under heat by polyaddition reactions (compositions called of the EVC polyaddition type), which comprises:
   (a') 100 parts by weight of a polydiorganosiloxane gum, which is a homopolymer or linear copolymer presenting on the average per molecule at least 2 vinyl groups linked to different silicon atoms, situated in the chain and/or at the end of the chain, of which the other organic radicals linked to the silicon atoms are selected from among the methyl, ethyl, phenyl radicals, at least 60 molar % of these other radicals (and optionally the totality of these other radicals) being methyl radicals, and said gum having a viscosity of at least 500,000 mPa.s at 25°;
   (b') at least one polyorganohydrogenolsiloxane selected from a among the monopolymers and the linear, cyclic or matrix copolymers having on average per molecule at least 3 hydrogen atoms linked to different silicon atoms and of which the organic radicals linked to the silicon atoms are selected from among methyl, ethyl, phenyl radicals, and 60 molar % at least of these radicals being methyl radicals, and having a viscosity going from 10 to 5,000 mPa.s at 25° C., the product (b') being utilized in a quantity such that the molar ratio of the hydride functions of (b') to the vinyl groups of (a') is comprised between 0.4 and;
   (c') a catalytically effective quantity of a platinum catalyst; and
   (d') 0.5 to 120 parts by weight of siliceous filler(s) per 100 parts by weight of the whole of the polyorganosiloxanes (a')+(b').

22. Cassette according to claim 18 wherein the polyorganosiloxane composition (A) is a monocomponent composition of the EVC type, comprising:
   (a") 100 parts per weight of a polydiorganosiloxane gum which is a homopolymer or a linear copolymer having on average per molecule at least 2 vinyl groups linked to different silicon atoms, situated in the chain and/or at the ends of the chain, of which the other organic radicals linked to the silicon atoms are selected from among methyl, ethyl, phenyl radicals, at least 60 molar % of these other radicals being methyl radicals, and said gum has a viscosity of at least 1 million mPa.s 25° C.;
   (b") 0.1 to 7 parts per weight of an organic peroxide; and
   (c") 0.5 to 120 parts per weight of siliceous filler(s) per 100 parts by weight of gum (a").

23. Cassette according to claim 18, wherein the polyorganosiloxane compositions are bicomponent compositions cross-linking at room temperature or under heat by polyaddition reactions, which comprise:
   (a) up to 50 parts by weight of a matrix copolymer comprising trimethylsiloxyl, methylvinylsiloxyl and $SiO_{4/2}$ units in which 2.5 to 10 molar percent of the silicon atoms comprising a vinyl group and in which the molar ratio of the trimethylsiloxyl groups to the $SiO_{4/2}$ group is comprised between 0.5 and 1.
   (c) at least 50 parts by weight of linear polydiorganosiloxane blocked at each chain extremity by a vinyldiorganosilyl unit of which the organic radicals linked to silicon atoms are selected from among methyl, ethyl and phenyl radicals, at least 60 molar % of these radicals being methyl radicals, and presenting a viscosity going from 400 to 50,000 mPa.s at 25° C., wherein products (a) and (b) total 100 parts by weight;
   (c) at least one polyorganohydrogenosiloxane selected from among the homopolymers and the linear, cyclic or matrix copolymers presenting on average per molecule at least 3 hydrogen atoms linked to different silicone atoms and of which the organic radicals linked to the silicone atoms are selected from among methyl, ethyl radicals and at least 60 molar % of these radicals being methyl radicals, and having a viscosity going from 10 to 5,000 mPa.s at 25° C., the product (c) being utilized in a quantity such that the molar ratio of the hydride functions of (c) on the vinyl groups of (b) is comprised between 1.1 and 4;
   (d) a catalytically effective quantity of a platinum catalyst; and
   (e) 0 to 120 parts by weight, of siliceous fillers per 100 parts by weight of the totality of the polymers (a)+(b)+(c).

* * * * *